3,502,482
EMULSIFIER FOR USE IN BAKING AND METHOD OF PREPARING THE SAME

Hermann Birnbaum, 5701 Munhall Road, Pittsburgh, Pa. 15217
No Drawing. Filed Oct. 10, 1966, Ser. No. 585,276
Int. Cl. A23d *5/00*, A21d *15/00*
U.S. Cl. 99—118            4 Claims

ABSTRACT OF THE DISCLOSURE

A thick smooth plastic dispersion for use as an emulsifier in baking and a method of its preparation. The disperly saturated fat-forming fatty acid having an iodine number of less than 5, triglyceride in about the ratio of 20% triglyceride to 80% monoglyceride, and 0.25 to 1% of tartaric acetyl esters of a monoglyceride or diglyceride of a fat-forming fatty acid.

---

This invention is for an emulsifier for use in the baking industry and the method of preparing the same.

Emulsifiers are commonly used in the baking industry and their important functions briefly stated are to modify the shortening to increase its dispersion through the dough, to bring about reduced surface tension between the fat and water, and improve the softness and anti-staling qualities of the bread. They must have two components—a lipophilic component compatible with fat, and a hydrophilic component compatible with water. Distilled monoglyceride of commerce comprising about 90% monoglyceride and the balance being diglyceride with a small percentage of triglyceride, by reason of the presence of hydroxyl groups combined with fat-forming fatty acid groups provide these properties, but those most desirable for use in bread, which are monoglycerides of highly or fully-saturated fatty acids with fourteen or more carbon atoms, being solids at room temperature, are not in themselves spontaneous emulsifiers. If they are melted to be combined with water, they initially form with the water a gel which is gummy and unmanageable and cannot be mixed out in the dough.

If distilled monoglycerides are re-esterified diacetyl tartaric acid anhydride to form diacetyl tartaric acid esters of mono and diglycerides, known more generally as TEM, they will provide a superior emulsifier, but TEM is relatively costly, and this may limit the extent of use.

Commercial lecithin, which is actually a complex of many compounds, the principal ones of which are lecithin and cephalin, may be considered as a triglyceride in which one fatty acid radical has been replaced by a phosphoric acid radical, has heretofore been used in small amounts, about 0.25% of lecithin per 100 lbs. of flour. It is a gummy brown substance of soft consistency, insoluble in water and soluble in fats and oils, and is used to improve the dough and impart other desirable properties to the bread.

It has been known that by the addition of tri or diglyceride to melted distilled monoglyceride the gelling, when mixed with water as hereinbefore referred to, could be overcome, the former being more effective than the latter. This, however, does not change the qualities of the monoglyceride as an emulsifier, since it merely introduces a lipophilic ingredient. Surface-active compounds to render the monoglyceride more readily miscible with water to form a dispersion have been used, but these are of a character which react with the fatty acid radical of the monoglyceride to form a soap, or are in the nature of a soap.

The present invention is based on the discovery that if the monoglyceride is combined with a substantially lesser amount of triglyceride and a relatively small amount of TEM or with commercial lecithin, the triglyceride will prevent the gelling of the monoglyceride while the TEM or lecithin, whichever is used, will in this combination, act as a surface-active co-emulsifier to enable a stable dispersion of these ingredients to be made with water. This preparation can be used as a relatively economical emulsifier for bakery use.

The term "monoglyceride" as used herein means a commercial grade of distilled monoglyceride of an edible fat-forming fatty acid, and which is normally a solid at room temperature. It is approximately 90% monoglyceride with the balance principally diglyceride and a small percentage of triglyceride. It is fully or nearly fully saturated, having an iodine number of 5 or below.

Triglyceride as used herein means any normal vegetable oil as triglycerides used for food shortening purposes.

EXAMPLE

A preferred example consists principally of about:

25% monoglyceride
5% vegetable shortening
1% TEM prepared from monoglyceride as herein described
0.25 mold inhibitor, such as sodium propionate
0.25 acetic acid or its equivalent as vinegar, or in such amount as may be necessary to bring the pH to a range of 4 to 5.5—preferably between 4 and 4.5.

The fat derived ingredients, that is, the monoglyceride, vegetable shortening and TEM, are heated together to a temperature of about 180° F. until the mix is all melted.

The water separately heated to about the same temperature, and with the mold inhibitor therein and the vinegar are then combined with fat-derived ingredients and the mixture is vigorously agitated prior to cooling to produce a dispersion that is smooth and thick. In commercial practice the mixture is vigorously beaten in a blender or disperator and forms a smooth, thick dispersion. When it reaches a temperature of about 160° F. it is preferably transferred to a second heat transfer type of agitator of the type known as a Votator and where, as it cools further, it is beaten until it develops a plastic shortening consistency.

The triglyceride is of primary importance in preventing the initial formation of the gel, and thereby functions also as an emulsifier, while the TEM or lecithin are surface-active co-emulsifiers and the effect of the triglyceride and TEM or lecithin appears to have a synergistic effect in promoting a stable dispersion.

The product is used similarly to other emulsifiers common to the industry in baking, and it can be used either in continuous or batch bread baking processes. In a typical bread baking procedure about 1 lb. of emulsifier per 100 lbs. of flour are used. Of this 1 lb. only 1% to 2.5% consists of either TEM or lecithin, so that the percentage is far less than the normal amount of either of these compounds when used alone as emulsifiers or bread improvers. The percentages of TEM and lecithin as herein described appears to be the optimum, and any appreciable increase in either results in no apparent improvement in the product. Apparently good dispersions have been prepared with as low as .25% of TEM, but it requires considerably more work in the form of beating to produce it, and represents a minimum below which it would be of no apparent benefit.

The monoglycerides most commonly employed are monostearin and monopalmitin, which have relatively high melting points, and are therefore especially beneficial in baking bread, and because of the apparent synergistic effect of the vegetable oil and the surface-active co-emulsifiers a highly effective dispersion of the monoglyceride and only a small percentage of these compounds, TEM or lecithin, is required. All of the ingredients in the amounts set forth are acceptable under the standards established by the Department of Public Health, Education and Welfare.

While I have specified desirable proportions, they are approximate, in that an effective but less satisfactory dispersion may be produced by varying these proportions, as may be determined by experiment.

I claim:

1. A thick, smooth plastic dispersion for use as an emulsifier in baking consisting principally of distilled monoglyceride of a highly saturated fat-forming fatty acid having an iodine number not higher than 5 and water, the water present in an amount of about 65–68% weight percent of the dispersion, in which is incorporated triglyceride in about the ratio of 20% of triglyceride to 80% of monoglyceride and tartaric acetyl acid esters of monoglyceride and diglyceride of a fat-forming fatty acid in the ratio of about 0.25 to about 1% of the weight of the dispersion.

2. The method of preparing an emulsifier for use in baking yeast-raised products comprising:
   (a) melting together to a temperature of about 180° F. a mixture of distilled monoglyceride of a fat-forming fatty acid having an iodine number of no higher than 5, triglyceride in the form of vegetable shortening, and diacetyl tartaric esters of mono and diglyceride with the triglyceride constituting about 20% of the weight of the mixture and the diacetyl tartaric ester comprising about 1%,
   (b) separately heating to about the same temperature a solution of acetic acid and water,
   (c) combining the heated water and acetic acid solution and the melted mixture of monoglyceride, triglyceride and diacetyl tartaric ester of monoglyceride, with the water to monoglyceride ratio being about 68% to 25% of the total and the acetic acid being in an amount sufficient to establish a pH in the range of 4 to 5.5, and
   (d) agitating the combined ingredients vigorously and cooling the mixture with continued agitation until a thick, smooth plastic dispersion is developed.

3. The method of preparing an emulsifier for use in baking as defined in claim 2 in which there is about 0.25% of a mold inhibitor added to the water and acetic acid solution.

4. The method of preparing an emulsifier for use in baking as defined in claim 2 wherein the agitation is first effected in a blender until the product cools to about 160° F. and thereafter agitating and cooling it in a heat transfer type of agitator until a smooth plastic dispersion resembling a plastic shortening results.

References Cited

UNITED STATES PATENTS

| 3,216,829 | 11/1965 | Hansen | 99—118 |
| 3,388,999 | 6/1968 | Kuhrt et al. | 99—118 |

LIONEL M. SHAPIRO, Primary Examiner

JAMES R. HOFFMAN, Assistant Examiner

U.S. Cl. X.R.

99—91; 252—316